Feb. 3, 1942. K. E. LÖFWALL 2,271,698
PROTECTIVE DEVICE FOR PREVENTING PERSONS FROM FALLING ASLEEP
AT THE WHEEL OF A MOTOR VEHICLE OR THE LIKE
Filed Sept. 4, 1940 2 Sheets-Sheet 1
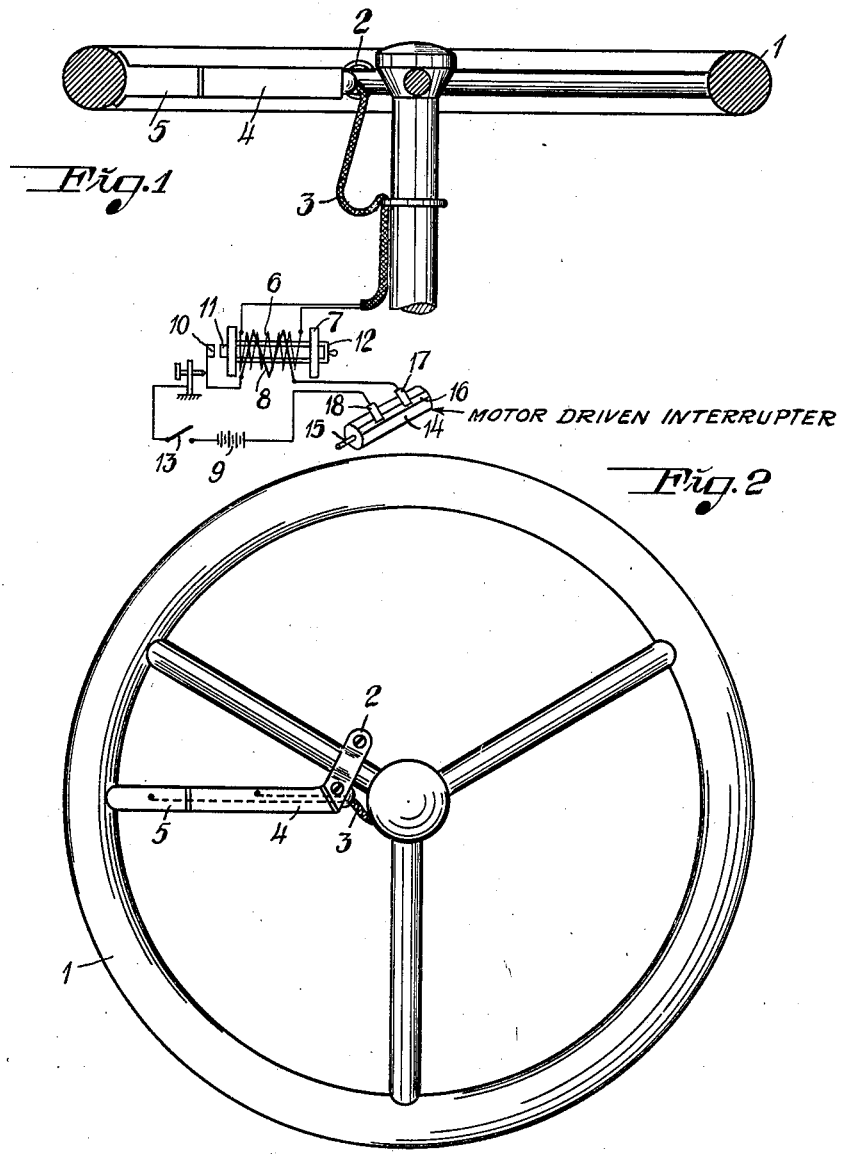
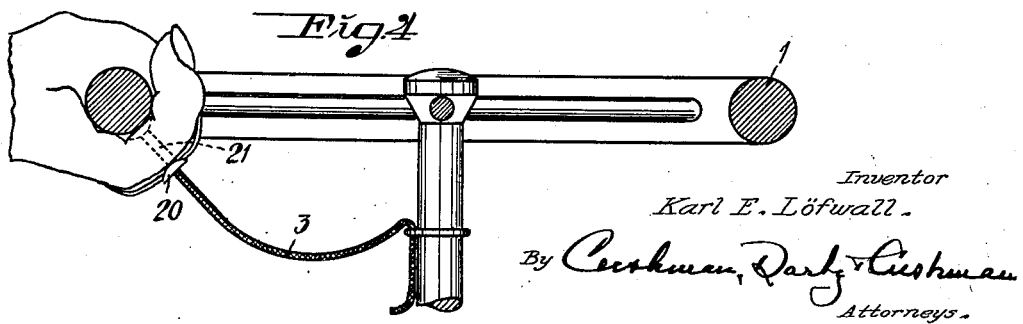

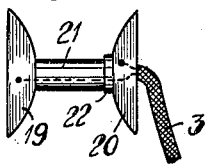
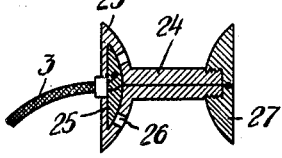
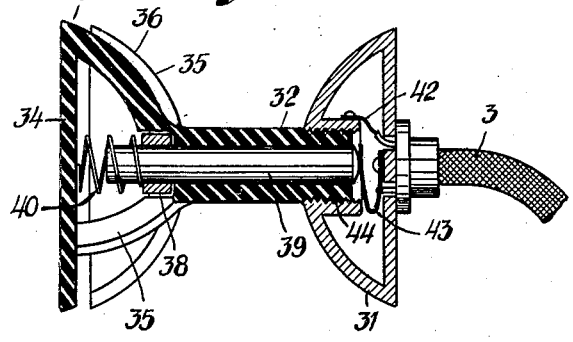
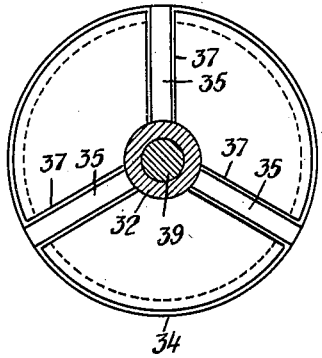
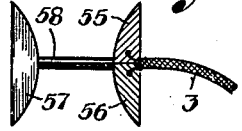
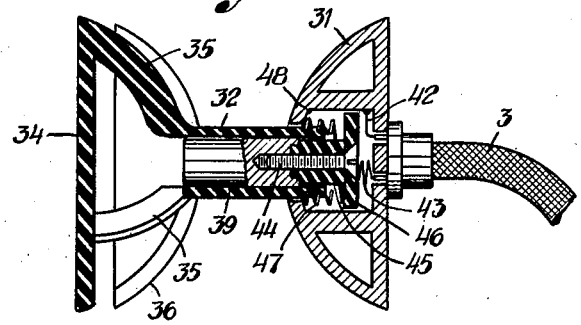
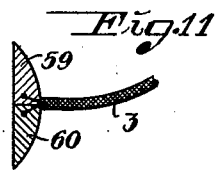
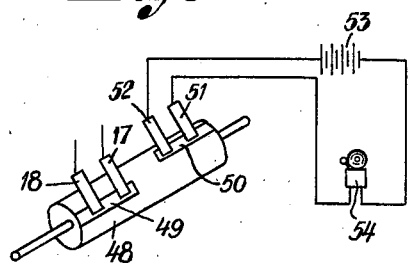

Patented Feb. 3, 1942

2,271,698

UNITED STATES PATENT OFFICE 2,271,698

PROTECTIVE DEVICE FOR PREVENTING PERSONS FROM FALLING ASLEEP AT THE WHEEL OF A MOTOR VEHICLE OR THE LIKE

Karl Erik Löfwall, Halsingborg, Sweden

Application September 4, 1940, Serial No. 355,388
In Sweden May 3, 1938

10 Claims. (Cl. 177—311)

The present application comprises a continuation-in-part of my prior application Serial No. 270,696, filed on April 28, 1939.

The present invention relates to a protective device for preventing persons from falling asleep at the wheel of a motor-vehicle or the like.

It is known to employ for this purpose an apparatus causing an electric shock to the pilot of an aeroplane for example, if the pilot's grip on the joy-stick relaxes at all. However, such an arrangement has turned out to be rather less suitable in motor-car driving for example, since it would seem that the symptoms of an accident, as it were, can be said to occur at the same moment as the grip is relaxed or even earlier, so that the electric shock often occurs too late. On the other hand the individual himself can when driving a car, especially on long straight roads, so-called "motor roads," often notice that his alertness shows an incipient tendency to relax.

The subject matter of the present invention is comprised by a protective device for preventing persons from falling asleep when driving a motor vehicle or the like comprising contact means arranged to be in contact with the person of the driver and to communicate an electric shock-action to him, means for imparting electric shocks connected to the said contact means, a source of current for supplying the said electric shock-imparting means, and means for producing an intermittent function of the protective device. Electrical impulses are issued by this device at certain time intervals, which can be adapted as desired, for example 60 seconds.

The object of the present invention is moreover, a new design of the contact arrangement on a protective device for preventing persons from falling asleep. Modern motor vehicles are being equipped more and more frequently with all kinds of arrangements on and by the steering wheel, which make it difficult for a contact device also to be attached to the wheel. The object of the invention is, now, contact means, which has been designed to be fixed between two or more fingers of one hand. Such means presents the further advantage that the driver or pilot respectively cannot easily free himself from contact with the said contact means. The fact that the driver or pilot would consciously remove the contact means for avoiding the shocks is hardly probable for it is of his own volition that he deliberately places the contact means between his fingers in the first place when he begins to feel himself less alert.

A further object of the invention is contact means, wherein the strength of the shock communicated is practically independent of the pressure between the contact means and the part of the body, engaging the said means. For this purpose either the contact between the contact surfaces and the person employing the protective device can be prevented, whereby the shock is brought about by spark-discharge from the contact surfaces, or also the contact means is arranged or designed in such a way that in addition to one or more contact surfaces, one or more parts insulated from the contact surfaces are present which partly take up the contact pressure so that the pressure exerted on the contact surfaces is substantially constant. This is of considerable importance on contact devices which are intended to be contacted by one or both of the driver's hands whilst the vehicle is being driven at the same time, since the driver then inevitably grips the contact device with varying tenacity, so that the shock imparted will be of varying intensity. Of especial significance is the adoption of measures on the lines mentioned on contact devices, which are so fixed that one or more contact surfaces come to lie between the driver's hand and the stearing wheel of the vehicle, for here the pressure on the contact device can vary to a very considerable extent. The contact devices with spark transmission present, moveover, the advantage that they impart a pricking sensation to the skin, which exercises a highly stimulating effect.

The object of the invention is finally a protective device for preventing persons from falling asleep when driving a motor-car or the like, wherein the driver is warned either by means of an acoustical or optical signal immediately before the electric shock is imparted. Such a device is particularly appropriate in combination with a contact arrangement of such a nature that for example by an extra powerful pressure thereon the electric shock can be prevented from being transmitted.

Further objects and advantages of the arrangement according to the invention will be evident from the following description.

Several different embodiments of the invention and especially of the contact means are represented in the drawings, where:

Fig. 1 shows in partial section a contact device arranged on a steering wheel and a device pertaining thereto for producing and transmitting intermittent impulses to the contact device;

Fig. 2 is a plan view of the steering wheel in Fig. 1;

Fig. 3 shows a contact device designed to be fixed between two fingers of the hand;

Fig. 4 shows how the contact device according to Fig. 3 is fixed to the steering column of the wheel and how it can be placed between a pair of fingers of one hand. Part of the steering wheel is removed;

Fig. 5 shows a contact device which is likewise arranged to be fastened between a pair of the fingers of one hand and on which the shock is produced by spark discharge;

Fig. 6 shows in section and on an enlarged scale a further embodiment of a contact device which is designed to be arranged between a couple of the fingers of one hand;

Fig. 7 shows the contact arrangement in Fig. 6 in the section along the line A—A in Fig. 6.

A still further embodiment of a contact device which is designed to be arranged between a pair of the fingers of one hand is shown in Fig. 8 on an enlarged scale and in section.

Fig. 9 shows a part of intermittent means designed to close an extra current circuit designed for acoustical or optical signal emission before the circuit for supplying the induction means shown in Fig. 1 is closed.

Fig. 10 shows another contact device designed to be fixed between two fingers of the hand.

Fig. 11 shows a contact device having only one supporting surface designed to be placed inside the hand.

In Figs. 1 and 2 attached to one of the spokes of the steering wheel 1 by means of a holder 2 are contact pieces 4, 5 which are insulated from one another. The current to the contact pieces is supplied through a double-stranded flexible cable 3 from the secondary winding 6 of induction means 7. The primary winding 8 of the induction means is supplied from a battery 9 and the primary current is broken in known manner by a breaking switch 10 actuated by the core 11 of the induction means. For regulating the strength of the electrical impulses supplied by the induction means the core 11 is surrounded by a protective cover 12, which can be drawn out and in this way more or less screen the core 11. Connected in the circuit from the battery 9 to primary winding 8 of the induction means, there is in addition to a breaker 13 intended for manual operation also an intermittent means consisting of a rotating roller 14, which is possibly driven from some suitable motor over gear transmission-means, for example clockwork. Part of the covering of the roller 14 is comprised by a narrow strip 16 which is parallel to the spindle 15 of the roller and composed of conducting material whilst the other part is of insulating material. Engaging the roller are two slide contacts 17, 18 connected in the circuit leading from the battery 9 to the primary winding 8 of the induction means 7 and these contacts close this circuit, assuming that the breaker 13 is closed, when the conducting strip 17 passes underneath the slide contacts during rotation of the roller.

The arrangement functions in the following way: When the driver feels that the risk of his alertness flagging is imminent, possibly due to the monotony of a long straight road or the monotonous drone of his engine, he switches in the intermittent means and closes the breaker 13. If he now touches the contact pieces 4 and 5 he receives shocks at certain intervals, the duration of which is determined by the width of the strip 16 and the speed of rotation of the roller 14. The interval between these periods is likewise determined by the speed of rotation of the roller 14. By displacement of the screen 12 the intensity of the impulses or shocks can be regulated to the desired extent.

The contact device can be placed at any suitable point within the driver's reach and does not necessarily need to be attached to the wheel. It can for example be fixed to the instrument board or at the side of the driver's seat. It can also be designed as a loose unit which the driver can attach to his person. Some embodiments of such a contact device will be further described below.

The contact device shown in Fig. 3 comprises two supports 19 and 20 and a neck member 21 holding them together. The supports 19 and 20 constitute contact pieces and are insulated from one another by means of a part 22. The contact pieces 19 and 20 are connected each to its own conductor in the flexible cable 3.

When a driver feels the necessity of protection against falling asleep he places the contact device between a couple of the fingers of one hand and closes the circuit by means of the breaker 13 shown in Fig. 1. As will be seen from Fig. 4 such a contact device does not in any way hinder the movements of the hand round the wheel. The flexible cable can of course be fixed to any other desired place than the steering column.

Instead of only one neck member connecting the supporting surfaces several such neck members can be arranged so that the contact arrangement lies between more than two fingers of the hand.

The above described embodiments of the contact arrangement suffer from the disadvantage that the shocks perceived by the driver are not perceived with invariably the same strength, due to the fact that his grip on the contact arrangement varies in intensity. Especially in the design shown in Figs. 3 and 4 will the contact pressure and to a certain extent the shock also vary dependent upon how hard the contact device is pressed against the wheel. It is, however, of particular importance that a substantially invariable shock should be imparted and the risk avoided either of the shock being much too strong and therefore particularly unpleasant or too slight and thereby failing of its effect. For avoiding this disadvantage any of the constructions as shown in Figs. 5–8 can be employed.

The contact arrangement according to Fig. 5 is of substantially the same design as the contact arrangement shown in Fig. 3. It therefore consists of two supports with a co-operating neck and is intended to be arranged between two fingers of one hand. One of the supports comprises a hollow part 23 of insulating material which is designed in one piece with the neck 24. Arranged in the part 23 is a part 25 of conductive material. The part 25 forms the actual contact surface. In the part 23 a number of openings 26 are formed in the cup-like surface which engage the fingers when the contact arrangement is arranged between a couple of the fingers of one hand. Screwed on the free end of the neck member is a support 27. It is possible for the neck 24 and the support 27 to be designed in such a way that the distance between the supports becomes adjustable and can be adapted to different thicknesses of fingers.

The contact part 25 is connected to one pole of the secondary winding 6 of the induction apparatus 7. In this construction it is, moreover, appropriate to earth the other pole of the secondary winding and also to connect the support 27 to earth. When the protective device is switched in, a spark discharge from the contact part 25 through the openings 26 to the driver's hand is produced. In this case, therefore, the shock is rendered quite independent of the contact pressure.

The contact device shown in Figs. 6 and 7 comprises two supporting surfaces and a neck member holding them together which is intended to be arranged between the fingers. The support 31 is of conductive material and comprises one contact of the contact device. The neck member comprises on the outside a tube 32 of insulating material, which is designed in one piece with the pressure-absorbing parts 35 of the other supporting surface, to which a base (a plate on the drawings) is fixed in such a way that an intervening space is formed between the supports 35 and the plate 34. The number of supports can of course vary according to different conditions and need not be three in number as is the case in the embodiment shown. In the said intervening spaces a bowl-like contact plate 36 is interposed which is provided with recesses 37 midway of the supports 35, so that the intermediate parts can project forward beyond the cup-shaped surface defined by the supports 35. The hub 38 of the contact plate 36 slides on a pin 39 fixed in the tube 32 and composed of conductive material, being pressed by a spring 40 in the direction towards the support and contact surface 31. At its outer end the tube 32 is provided with screw threads and screwed into the contact 31. By this means the possibility is afforded of adjusting the distance between the supporting surfaces depending on the thickness of the hand. Connected to the contact 31 which is designed to be arranged on the outside of the hand is a conductor in the form of a flexible cable 3 from the secondary side of the induction apparatus. One of the conductors 42 of the flexible cable is directly connected to the contact 31 whilst the other conductor terminates in a spring plate 43 engaging the pin 39 which is duly connected to the contact 36 sliding on the pin 39. The flexible cable 3 is fixed in such a way that it permits the actual contact device to follow the hand upon the manipulation of the wheel.

Instead of a flexible cable it is possible to use on certain forms of the invention an articulated arm which is fixed to the wheel spindle.

The contact arrangement is employed and operates in the following way. Firstly the distance between the supporting surfaces is adjusted by the tube 32 being screwed more or less in the contact 31. When the arrangement has been adapted to the hand, preferably so that the spring 40 is pressed together to some extent when the arrangement is placed between the fingers the electrical device is switched in by means of the breaker 13. The contacts 31 and 36 engage the outside or inside of the fingers respectively and impart shocks thereto. If the hand then grips tighter round the wheel, that is to say the plate 34 is pressed harder against it, the contact 36 will be pressed against the action of the spring 40 in towards the plate 34 until the parts of the contact lying in between the recesses come up to a level with the support 35. If the pressure is then further increased the pressure increase will be taken up mainly by the support 35 so that the contact pressure remains substantially constant and determined by the spring 40.

Although the supporting surface 31 is shown as a fixed surface, this can of course also be designed as a resilient spring contact. Instead of the distance between the supporting surfaces being adjustable by the tube 32 being more or less screwed in the contact 31 the supporting surfaces can also be made totally resilient relatively to one another. Another modification is to arrange both contacts in a supporting surface. The above-described arrangement is particularly suitable as there is only one current-carrying contact and the other is either absent or possibly connected to earth.

The cup-shaped design of the supporting surfaces is especially suitable but of course not indispensably necessary. It is, however, of advantage for the surfaces to be somewhat conical towards the neck member.

A contact arrangement wherein the pressure on both contacts is the same despite the fact that they do not lie on the same supporting surface is shown in Fig. 8. This contact device is intended to be employed in a manner corresponding to that described in Figs. 6 and 7 and corresponding parts have also received the same reference figures. It differs, however, from the preceding device among other things in regard to the fact that the insulation tube 32 is not screwed fast in the contact 31 and that the pin 39 is not fixed in the tube 32 but can slide therein. At the end of the pin 39, which is made in one piece with the contact 36 there is firmly screwed by means of a screw 44 an end piece 45 of insulation material with an abutment 46 engaged by a compression spring 47, the other end of which engages an abutment 48 on the inside of the contact 31.

The contact arrangement should preferably be so adapted that the spring 47 is tensioned somewhat when the arrangement is placed between the fingers of the hand. The spring 47 has the effect that the contact pressure between the surfaces 31 and 36 and the fingers will be substantially constant. If the hand is then pressed against the steering wheel so that the plate 34 engages it, the pressure-absorbing parts, the supports 35, will be displaced into such a position that the outer surfaces thereof will come to lie at a level with or extend somewhat beyond the outer surfaces of the contact. The supports 35 will take up the pressure of the hand against the wheel and the contact pressure is still determined by the spring 47. By this means any increase of the contact pressure, such as can involve the disadvantages set forth above, will be prevented.

By designing on the contact arrangement according to Fig. 6 the extreme left hand end of the pin 39 of insulating material so that the circuit from the conductor 43 to the hub 38 is broken when the contact 36 is pressed to a sufficient extent to the left so that the hub 38 comes entirely on the insulated end of the pin 39, by sufficiently strong pressure on the contact surfaces 36, electric shocks may be prevented from being transmitted to the hand. Such a design of the contact arrangement can suitably be combined with a special design of the intermittent means, which can for example receive the form as shown in Fig. 9. On the roller 48 in addition to the conductive strip 49 which can close a connection between the contacts 17 and 18 and which now does not extend over the whole length of the roller is a further conducting strip 50, engaged by two slide contacts 51, 52. These contacts are switched in a circuit containing a source of current 55 and a signal device 54. In the figure a bell signal is shown, but it may instead be replaced by a lamp if an optical signal is desired in place of an acoustic signal. The conducting strip 50 is arranged in such a way that the contacts 51, 52 are closed for a short while before the slide contacts are closed. Now, if the contact device is of the type as last described wherein the shock effect can be prevented by pressure on the contact surfaces the driver can, every time he notices a signal from the signal device 54, by exercising powerful pressure on the contact surfaces prevent his receiving any electric shock. If, on the other hand, the driver has relaxed his grip so much that he does not notice the signal from the signal device 54 and hence does not exercise a particularly powerful pressure on the contact surfaces either, he will receive an invigorating shock. Instead of the electrical signal device, as here described, a mechanical one may be employed.

A contact arrangement according to Fig. 5 can, in order to prevent a shock effect after an observed signal, be so designed that the electric shocks are not imparted. The contact portion 25 can for example be arranged movable inside the insulation socket, so that upon pressure on a button connected to the part 25 or the like, the part 25 is displaced from the openings in the insulating socket to such an extent that "sparking over" does not get a chance to occur.

Of course it is not necessary to prevent the current from being conveyed by pressure on the contact device. A contact breaker appropriately designed and placed in a suitable situation and capable of being brought into operation by a slight movement on the part of the driver, can for example be employed for this purpose instead.

Fig. 10 shows a contact device likewise designed to be arranged between the fingers, one of the supporting surfaces of which presents two contacts 55 and 56. These are connected together with the supporting surface 57 by means of an elastic rubber band 58, whereby the supporting surfaces are rendered resilient in relation to one another.

Fig. 11 shows a contact device having only one supporting surface, presenting two contacts 59 and 60. The contacts are placed inside the hand and the flexible cable 3 between the fingers. The flexible cable should be held tensioned and resilient by means of any suitable device (not shown).

Provision for the shock effect being fairly constant even with varying pressure against the contact means can best be made by spark discharge using movable contact surfaces or movable insulated parts, but even with direct contact and without moving parts the pressure against the contact surfaces can to a certain extent be limited by arranging these to be slightly let-in in apertures and in insulated material.

For providing the contact device with suitable electric current any suitable electric devices can be employed. For example the electric battery provided on every motor car can be employed as a source of current. It is also possible via an intermittent device to supply the contact device with electric current from the ignition system of the car. In this latter case it is appropriately likewise well possible to interpose a regulable resistance, whereby the intensity of the shock effect can be regulated.

For the intermittent communication of the shock effect various devices can be employed, such as mechanical and thermal circuit-breakers, means for short-circuiting the current etc.

The above description of the device in accordance with the invention is given only in order to illustrate some practical embodiments of the invention, but of course the arrangement according to the invention can well be designed in other ways. The contact device can for example be so designed as to be fixed to a lug. Furthermore it can be designed in the form of a finger ring or an armband, in which case a release device should be present.

It is, therefore, evident that every such modification of the design falls within the scope of the invention, as above defined.

I claim:

1. On a protective device for preventing persons from falling asleep when driving motor vehicles or the like, comprising contact means arranged to be in contact with the person of and to impart an electric shock effect to the driver, comprising two supporting surfaces, at least one of which is arranged likewise to serve as a contact surface and at least one neck member combining the supporting surfaces, the said neck member being arranged to be fitted between a couple of the fingers of one hand so that the supporting surfaces come to engage the outside and inside of the hand respectively.

2. On a protective device for preventing persons from falling asleep when driving motor vehicles or the like, comprising contact means arranged to be in contact with the person of and to impart an electric shock to the driver, comprising two supporting surfaces, at least one of which is adapted likewise to serve as a contact surface and at least one neck member connecting the supporting surfaces, the said neck member being arranged to be placed between a couple of the fingers of one hand so that the supporting surfaces enter into engagement with the outside and inside of the hand and fixing members for fixing at least one of the supporting surfaces on the neck in such a manner that the distance between the supporting surfaces can be regulated.

3. On a protective device for preventing persons from falling asleep when driving motor vehicles or the like, comprising contact means arranged to be in contact with the person of and to impart an electric shock to the driver, comprising two supporting surfaces, at least one of which is adapted likewise to serve as a contact surface and at least one neck member connecting the supporting surfaces, the said neck member being arranged to be placed between a couple of the fingers of one hand so that the supporting surfaces enter into engagement with the outside and inside of the hand and resilient means which automatically adjust the distance between the supporting surfaces according to the thickness of the fingers.

4. On a protective device for preventing persons from falling asleep when driving motor vehicles or the like, a contact means arranged to be in contact with the person of and to impart an electric shock to the driver, comprising one or more contact surfaces and one or more parts insulated from the contact surfaces, wherein at least one insulated part is movable relatively to at least one contact surface, whereby a pressure exerted on the contact device can be distributed both on contact surfaces and insulating parts, so that an even pressure between the part of the driver's person contacting with the contact means and contact surfaces is obtained.

5. On a protective device for preventing persons from falling alseep when driving motor vehicles or the like, a contact means arranged to be in contact with the person of and to impart an electric shock to the driver, comprising one or more contact surfaces and one or more parts insulated from the contact surfaces, whereby at least one contact surface is movable relatively to at least one insulated part, whereby a pressure exerted on the contact device can be distributed on both contact surfaces and insulated parts so that an even pressure is obtained between that portion of the person of the driver in contact with the contact means and contact surfaces.

6. On a protective device for preventing persons from falling alseep when driving motor vehicles or the like, a contact means arranged to be in contact with the person of and to impart an electric shock to the driver, comprising one or more contact surfaces and one or more parts insulated from the contact surfaces and resilient means acting on the contact parts so that these parts shift forward relatively to the insulated parts and, when no pressure is exerted on the contact means, preferably extend somewhat outside the insulated parts, but when pressure is exercised can be pressed back and thereby come to lie in a level with or somewhat deeper than the surfaces of the insulated parts.

7. A protective device for preventing persons from falling alseep when driving motor vehicles or the like, comprising a contact means arranged to be in contact with the person of and impart an electric shock effect to the driver and automatic means for intermittently imparting the said shock effect together with a signal means which issues a signal before the electric shock effect is imparted.

8. A protective device for preventing persons from falling asleep when driving motor vehicles or the like, comprising a contact means arranged to be in contact with the person of and impart an electric shock effect to the driver and automatic means for intermittently imparting the said shock effect together with a signal means which issues a signal before the electric shock effect is imparted and means operable by the driver to render the contact means unable to impart the shock effect.

9. A protective device for preventing persons from falling asleep when driving motor vehicles or the like, comprising a contact means arranged to be in contact with the person of and to impart an electric shock effect to the driver and means for intermittently shocking the driver as long as he is in contact with the contact means, regardless of the condition of wakefulness of the driver.

10. In a protective device for preventing persons from falling asleep when driving motor vehicles or the like, a contact means arranged to impart an electric shock to the driver, comprising one or more electrodes and parts insulated from the electrodes, said parts being arranged to be in contact with the driver and to always maintain a small distance between the electrodes and the body of the driver, so that the electric shock is transmitted from the electrodes to the driver in form of a spark discharge.

KARL ERIK LÖFWALL.